Aug. 22, 1950          M. G. BROWN          2,519,997
COMPARISON METHOD FOR MEASURING THE
HEMOGLOBIN CONTENT OF BLOOD
Filed Nov. 10, 1945
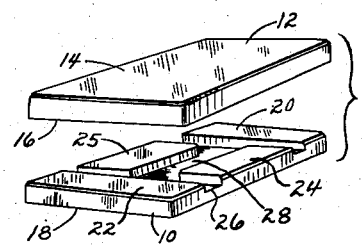
Fig. I
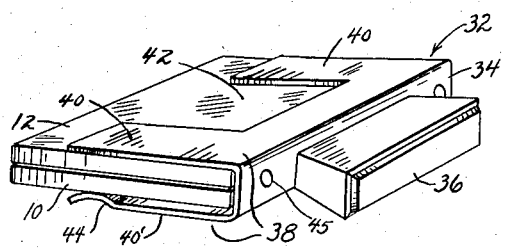
Fig. II
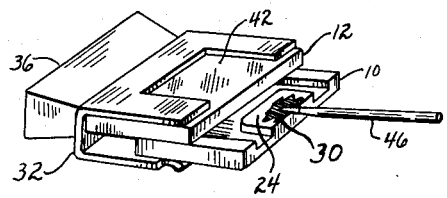
Fig. III
Fig. IV
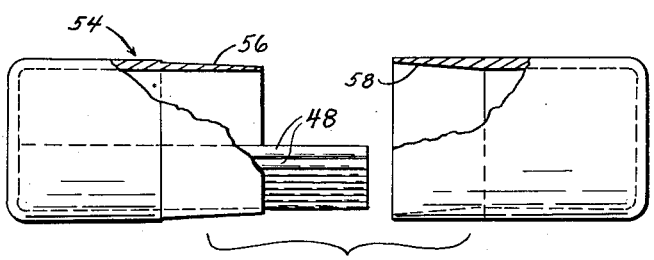
Fig. V
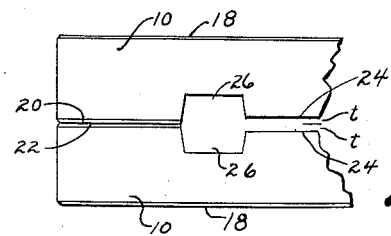
Fig. VI
INVENTOR.
MORDEN G. BROWN
BY
ATTORNEY Patented Aug. 22, 1950

2,519,997

UNITED STATES PATENT OFFICE 2,519,997

COMPARISON METHOD FOR MEASURING THE HEMOGLOBIN CONTENT OF BLOOD

Morden G. Brown, Williamsville, N. Y., assignor to American Optical Company, Southbridge, Mass., a voluntary association of Massachusetts Application November 10, 1945, Serial No. 627,873

6 Claims. (Cl. 88—14)

This invention relates to a method for conveniently, precisely and rapidly determining the hemoglobin concentration of blood.

Various conditions of a patient's blood have a direct and material influence upon the health of the patient. Accordingly, accurate measurements of any of these conditions of the blood are highly desirable as, for example, measurements of the hemoglobin concentration in the blood which may be used to accurately indicate a normal condition or an abnormal condition of the patient's blood such as anemia.

Since the hemoglobin concentration or red pigment of the blood is directly associated with the patient's condition, measurements of said concentration are widely used by physicians for diagnoses and for accurate records of individual case histories. Such determination of the concentration of hemoglobin in the blood is generally made colorimetrically and can not be made as accurately with untreated whole blood as with hemolyzed blood since the variations in the number of blood cells, size and shape have a direct bearing thereon. A colorimetric determination of the hemoglobin concentration of the blood, accordingly, may be best had when the red pigment thereof is evenly distributed throughout the blood specimen and not concentrated in cells separated by clear plasma.

Accordingly, it is an object of this invention to provide an improved method for subjecting a specimen of blood, which is in its most convenient form, oxyhemoglobin, produced merely by exposure to air, to a treatment to hemolyze the said specimen to bring about a uniform distribution of red pigment or hemoglobin therein. It is a further object of the invention to form this specimen into a layer of uniform predetermined thickness whereby the light-absorbing characteristics of this specimen may be studied and compared against a comparison member or a series of comparison members having known light-absorbing values, to thereby obtain an accurate indication of the hemoglobin condition of the patient's blood.

It is also an object of the invention to provide convenient means in the form of a blood chamber assembly comprising a pair of specially formed transparent plates, providing surfaces for receiving and holding a specimen while being hemolyzed, and a clamp for holding these members together to produce a relatively thin layer of predetermined thickness between said plates, whereby the light-absorbing properties may be easily observed or measured.

It is also an object of the invention to provide and employ a pair of similar specimen-receiving plates so that these plates, when brought together, form a blood chamber of double thickness, whereby a specimen of double predetermined thickness may be examined, such being extremely important for accurate results in cases of extreme anemia.

Further objects and advantages of the invention will become apparent from a consideration of the detailed description which follows taken in conjunction with the accompanying drawings wherein a preferred form of the apparatus and certain steps in the method are shown and described. It will be understood, however, that the invention is not to be limited to the details of the disclosure except as defined by the appended claims since the disclosure is given for purposes of illustration only.

In the drawings:

Fig. 1 is a perspective view of a pair of plates which may be used as a part of the apparatus of the invention, said plates being shown in spaced relation in order to disclose the details of construction thereof;

Fig. 2 is a perspective view of the plates of Fig. 1 shown in clamped relation in a resilient holder and ready for use;

Fig. 3 is a perspective view of the plates likewise positioned in the holder, but having a specimen-receiving area of the lower plate offset or moved outwardly to a position for receiving a specimen thereon, and with a treated stick or rod in position for stirring the specimen on the specimen-receiving plate;

Fig. 4 shows an enlarged view of the treated stick of the invention;

Fig. 5 shows a carrying case or container for receiving a plurality of said sticks or rods, said container forming a substantially moisture proof enclosure therefor; and Fig. 6 is an enlarged fragmentary view showing two similar specimen-receiving plates placed together for use in forming a blood chamber of double thickness.

Referring to the drawings in detail, and particularly Fig. 1, the numeral 10 indicates generally a lower specimen-receiving plate which may be used in combination with a cover plate 12 of equal size, general shape and thickness. Both of said plates are transparent. The upper and lower surfaces 14 and 16 of the upper plate are accurately finished to provide optically flat surfaces or parallel planes thereon. The lower plate 10 is likewise finished upon its lower surface 18 and has its upper laterally spaced side rail portions 20 and 22 accurately formed so as to be parallel to and equally spaced from the bottom surface 18. The surfaces 20 and 22 are laterally spaced from a pair of intermediate specimen-receiving areas 24 and 25 by means of grooves 26, and said areas are also spaced from each other by an intermediate groove 28. The grooves 26 and 28 are of a depth sufficient to form spaces for receiving excess blood from the area 24 or 25 when the plates 10 and 12 are assembled one upon the other. The areas 24 and 25 for receiving the blood specimen 30, as indicated in Fig. 3, are accurately formed so as to be disposed a predetermined distance below the plane of the side rail portions 20 and 22, and are arranged parallel to said plane, thereby forming a space of uniform predetermined thickness between each of these areas and the cover plate 12 when the cover plate is positioned thereover.

The plates 10 and 12 may be conveniently and firmly held in an assembled position by a clamp or holder 32 which is formed of resilient material, such as bronze, stainless steel or the like, and has a base portion 34 to which a handle 36 of suitable size and shape may be riveted or otherwise secured. The holder is provided with a pair of spaced resilient side members 38 extending in substantially parallel relation from the base portion 34, and one of said side members is provided with an upper pair of arms 40 and the other of said side members is provided with a lower pair of arms 40' arranged in laterally spaced relation to provide upper and lower unobstructed areas or spaces 42 aligned with specimen-receiving areas 24 and 25 through which the specimen 30 may be observed. The distance between the members 38 is somewhat greater than the combined thickness of the plates 10 and 12, as is clearly indicated in Fig. 2, so that the lower pair of arms 40' may be provided with inwardly curved end portions 44, as shown, to engage the outer surface of one of the plates and press both plates into firm engagement with the other pair of resilient arms 40. Thus, when these plates are in an assembled position in the holder, they will be firmly clamped together and provide between the areas 24 or 25 and the cover plate a space of predetermined thickness. A pair of indentations 45 are pressed into the base portion 34 near opposite ends thereof so that they will be engaged by the inner edges of the plates 10 and 12 when in the holder 32 and space these plates from the inner wall or surface of the base portion 34 thus preventing any blood which may be on these edges from touching and adhering to said inner surface.

Fig. 3 shows the specimen plate 10 and cover plate 12 in an assembled position clamped between the resilient arms 40, 40' of the holder 32 and the specimen plate 10 is positioned so that the specimen-receiving area 24 is exposed and may have placed thereon a blood specimen 30. A treated rod or stick 46 is shown in contact with the area 24 and the specimen 30 thereon for a purpose to be presently described. The rod or stick 46 is best shown in Fig. 4 and may be formed of a suitable stiff or rigid inert material, such as wood. It comprises an elongated handle portion 48 provided with straight parallel sides which extend the greater portion of the length of the stick and a tapered portion 50 adjacent an end thereof as indicated at 51 so as to provide a reduced end portion for receiving an hemolytic agent 52. By the words "inert material" as used above and hereinafter in the specification and claims is meant a material which will not be materially affected by the hemolytic agent forming the coating 52 and which will not alter the condition of the blood specimen under examination.

The rod or stick may be made of any preferred cross-sectional shape desired, but as shown is circular. While the proportions or dimensions of this rod or stick may vary somewhat, a preferred size would be between 1¼ and 1¾ inches in length and from $\frac{1}{16}$ to $\frac{1}{8}$ of an inch in thickness. The tapered end portions 50 of the rod or stick 46 is formed so as to receive the coating 52 upon the outer end thereof and support said coating in a space entirely within the planes containing the parallel sides of the stick, whereby the hemolytic material will be normally spaced from or above any supporting surface upon which the stick rests, or spaced from the side walls of a container or the like used therewith, or spaced from other similar sticks when bunched together in said container.

A suitable hemolytic agent which has been found to give satisfactory results for forming the layer or coating 52 may comprise saponin which may be applied to the stick by forming a tacky solution of saponin in water or other suitable solvent and dipping the ends of the rods or sticks 46 into said solution. The coating on the rod or stick is then air dried or dried in an oven at temperatures not exceeding 200° F. Improved results may be obtained by adding a small amount of sodium oxalate or other anti-coagulant to the hemolytic agent to be applied to the rods or sticks, which additional material will materially lessen the tendency of the blood specimen to coagulate.

It is desirous that the treated rod or stick 46 be formed of stiff, durable and inert material in order that the material forming the hemolytic agent will not be affected thereby. A convenient amount of hemolytic agent upon the tapered end of the stick has been found to be provided by dipping each stick to a depth of from $\frac{1}{16}$ to $\frac{1}{4}$ of an inch into said hemolytic solution with or without the anti-coagulant as desired. A container 54 is shown in Fig. 5, said container being formed of a substantially moisture proof plastic material to serve as a suitable means for storing and transporting a plurality of sticks as part of the equipment of the invention. Relatively long tapered portions are formed at 56 and 58 on the two parts of this separable container in order to provide a substantially air tight joint between the two parts, in order that moisture or dampness of the outside air may be excluded from the container and thus not affect the condition of the hemolytic material upon the ends of the sticks contained therein.

A preferred method of use of the apparatus described above for the determination of the hemoglobin content or concentration of the blood specimen comprises puncturing the finger or lobe of the ear of the patient to obtain a small quantity of blood to be tested, said blood being placed upon the area 24 or 25 of the plate 10, when in a separated condition as shown by Fig. 1 or when in an assembled position with the plate 10 offset or projecting outwardly of the plate 12 and gripped by the resilient arms of the holder as shown by Fig. 3, and this may be done by merely touching the area 24, or 25, to the finger or ear lobe. The specimen 30 so obtained on the specimen-receiving area is then agitated or stirred by the treated end of the stick 46. When the specimen is subjected to the hemolyzing agent, such as saponin, for a sufficient time during the stirring operation, such as for a period ranging from five to fifteen seconds, a hemolyzing action upon the blood specimen will be produced, which action brings about a rupturing of the membranes surrounding the individual red cells or corpuscles of the blood, allowing the red pigment or hemoglobin thereof to be evenly distributed throughout the specimen and thereby producing a solution of substantially uniform hemoglobin concentration.

The plate 10 containing the hemolyzed solution so produced may then be covered by the cover plate 12 and pressed or slipped into place in the holder 32, as shown by Fig. 2, or may, if in the offset position shown in Fig. 3, be pressed inwardly to a position adjacent the cover plate 12 so that, in either case, the prepared solution will be contained between the lower surface 16 of the plate 12 and the area 24, or 25, of the plate 10 as a uniform layer of predetermined thickness. The solution so prepared will tend to spread over the entire specimen-receiving area by capillary attraction between these adjacent slightly spaced surfaces. Any excess solution at the outer edge of the plates 10 and 12 may be wiped therefrom and if there is an excess amount on the area when the cover plate is placed over the area 24, or 25, it may flow into the grooves 26 or 28 or to the outer edges of the plates 10 and 12 as the layer of predetermined thickness is formed.

When a layer of uniform thickness of prepared solution has been produced between the plates 10 and 12, these plates may be positioned in the field of a colorimetric device or the like and the light-absorption properties thereof observed and compared with a standard comparison member or a series of standard comparison areas of known light-absorbing values. Thus when a comparison area of known value and of light-absorbing properties which are the same as the specimen has been ascertained an accurate indication of the hemoglobin concentration of the specimen may be determined therefrom.

In cases of extreme anemia where the amount of red pigment or hemoglobin in the blood is relatively small the physician may employ to good advantage two specimen-receiving plates 10 with the specimen-receiving areas thereon facing each other as shown by Fig. 6, thereby forming blood chambers between each adjacent pair of areas of double predetermined thickness as indicated by the letters $t$ and $t$ and, accordingly, the specimen placed therebetween will have double light-absorbing values which may be, in said cases of extreme anemia, more accurately observed and measured or compared in a colorimetric device, or the like, than could the specimen if it were only half as thick. Obviously, in such a combination of similar plates a blood chamber of single thickness $t$ may readily be formed when desired by merely placing the upper plate up-side-down upon the lower plate since surfaces 24 and 25 are parallel to and equally spaced from the surface 18.

Thus, it will be seen that a convenient, accurate and efficient method and apparatus have been provided for ascertaining the hemoglobin content or concentration of a patient's blood.

Having described the invention, I claim:

1. The method of measuring the hemoglobin concentration of a patient's blood comprising the steps of applying a specimen of said blood, extracted from said patient, upon a surface of a transparent specimen-receiving plate, stirring said specimen with an hemolytic agent in air for a time sufficient to bring about a rupturing of the membranes of the red cells of the blood and produce a substantially uniform distribution of the pigment thereof throughout said specimen to produce an oxyhemoglobin solution, positioning a transparent cover plate over said specimen-receiving plate and prepared solution so as to produce a layer of uniform predetermined capillary thickness and uniform pigment distribution therebetween, transmitting light through said plates and layer, and matching substantially the light-absorbing properties thereof with a comparison area of predetermined light-absorbing value whose hemoglobin concentration equivalent value is known for determining therefrom the equivalent hemoglobin concentration of the specimen under observation.

2. The method of measuring the hemoglobin concentration of a patient's blood comprising the steps of applying a specimen of said blood, extracted from said patient, upon a surface of a transparent specimen-receiving plate, stirring said specimen with an hemolytic agent comprising saponin in air for a time sufficient to bring about a rupturing of the membranes of the red cells of the blood and produce a uniform distribution of the pigment thereof throughout said specimen to produce an oxyhemoglobin solution, positioning a transparent cover plate over said specimen-receiving plate and prepared solution so as to produce a layer of uniform predetermined capillary thickness and uniform pigment distribution therebetween, transmitting light through said plates and layer, and matching substantially the light-absorbing properties thereof with a comparison area of predetermined light-absorbing value whose hemoglobin concentration equivalent value is known for determining therefrom the equivalent hemoglobin concentration of the specimen under observation.

3. The method of measuring the hemoglobin concentration of a patient's blood comprising the steps of applying a specimen of said blood, extracted from said patient, upon a surface of a transparent specimen-receiving plate, stirring said specimen with hemolytic and anti-coagulating agents in air for a time sufficient to bring about a rupturing of the membranes of the red cells of the blood and to produce a substantially uniform distribution of the pigment thereof throughout said specimen to produce an oxyhemoglobin solution, positioning a transparent cover plate over said specimen-receiving plate and prepared solution so as to produce a layer of uniform solution of predetermined capillary thickness between said plates, transmitting light through said plates and layer, and matching substantially the light-absorbing properties thereof with a comparison area of substantially equal light-absorbing value and whose hemoglobin concentration equivalent value is known.

4. The method of measuring the hemoglobin concentration of a patient's blood comprising the steps of applying a specimen of said blood, extracted from said patient, upon a surface of a transparent specimen-receiving plate, stirring said specimen with hemolytic and anti-coagulating agents comprising saponin in air for a time sufficient to bring about a rupturing of the membranes of the red cells of the blood and to produce a uniform distribution of the pigment thereof throughout said specimen to produce an oxyhemoglobin solution, positioning a transparent cover plate over said specimen-receiving plate and prepared solution so as to produce a layer of uniform predetermined capillary thickness between said plates, transmitting light through said plates and layer, and matching substantially the light-absorbing properties thereof with a comparison area of substantially equal light-absorbing value and whose hemoglobin concentration equivalent value is known.

5. The method of measuring the hemoglobin concentration of a patient's blood comprising the steps of applying a specimen of said blood, extracted from said patient, upon a surface of a transparent specimen-receiving plate, stirring said specimen with hemolytic and anti-coagulating agents comprising saponin and sodium oxalate in air for a time sufficient to bring about a rupturing of the membranes of the red cells of the blood and to produce an oxyhemoglobin uniform distribution of the pigment thereof throughout said specimen to produce a solution, positioning a transparent cover plate over said specimen-receiving plate and prepared solution so as to produce a layer of uniform predetermined capillary thickness between said plates, transmitting light through said plates and layer, and matching substantially the light-absorbing properties thereof with a comparison area of substantially equal light-absorbing value and whose hemoglobin concentration equivalent value is known.

6. The method of measuring the hemoglobin concentration of a patient's blood comprising the steps of placing a pair of specimen-receiving plates together in face to face relation with the specimen-receiving areas of each plate upon adjacent sides of said plates and with the specimen-receiving area of one plate projecting outwardly beyond the like area of the other plate sufficiently to expose same, applying a specimen of blood extracted from said patient upon said exposed area, applying an hemolytic agent to said specimen, stirring said specimen and agent in air sufficiently to produce a substantially uniform distribution of pigment throughout said specimen as an oxyhemoglobin solution, moving said projecting plate into an operative position so as to cause the specimen-receiving areas of said plates to lie adjacent each other and form a layer of solution of uniform predetermined capillary thickness, and matching substantially the light-absorbing properties of said layer with a comparison area of substantially equal light-absorbing value and whose hemoglobin concentration equivalent value is known.

MORDEN G. BROWN

REFERENCES CITED

The following references are of record in the file of this patent:

UNITED STATES PATENTS

| Number | Name | Date |
|---|---|---|
| 1,205,838 | Baldwin | Nov. 21, 1916 |
| 1,861,121 | Kapsenberg | May 31, 1932 |
| 2,102,785 | Brooks | Dec. 21, 1937 |
| 2,163,467 | Philipsen | June 20, 1939 |
| 2,209,764 | Cassen et al. | July 30, 1940 |
| 2,396,260 | Gradisar et al. | Mar. 12, 1946 |

FOREIGN PATENTS

| Number | Country | Date |
|---|---|---|
| 290,014 | Germany | Jan. 29, 1916 |

OTHER REFERENCES

Technical Manual, by War Department, On Methods for Laboratory Technicians, TM8-227, published in 1941, by Government Printing Office, page 99, paragraph 97.